May 7, 1935. W. M. SCHOLL 2,000,257
FOOT MEASURE AND SHOE SIZE INDICATOR
Filed Feb. 15, 1934
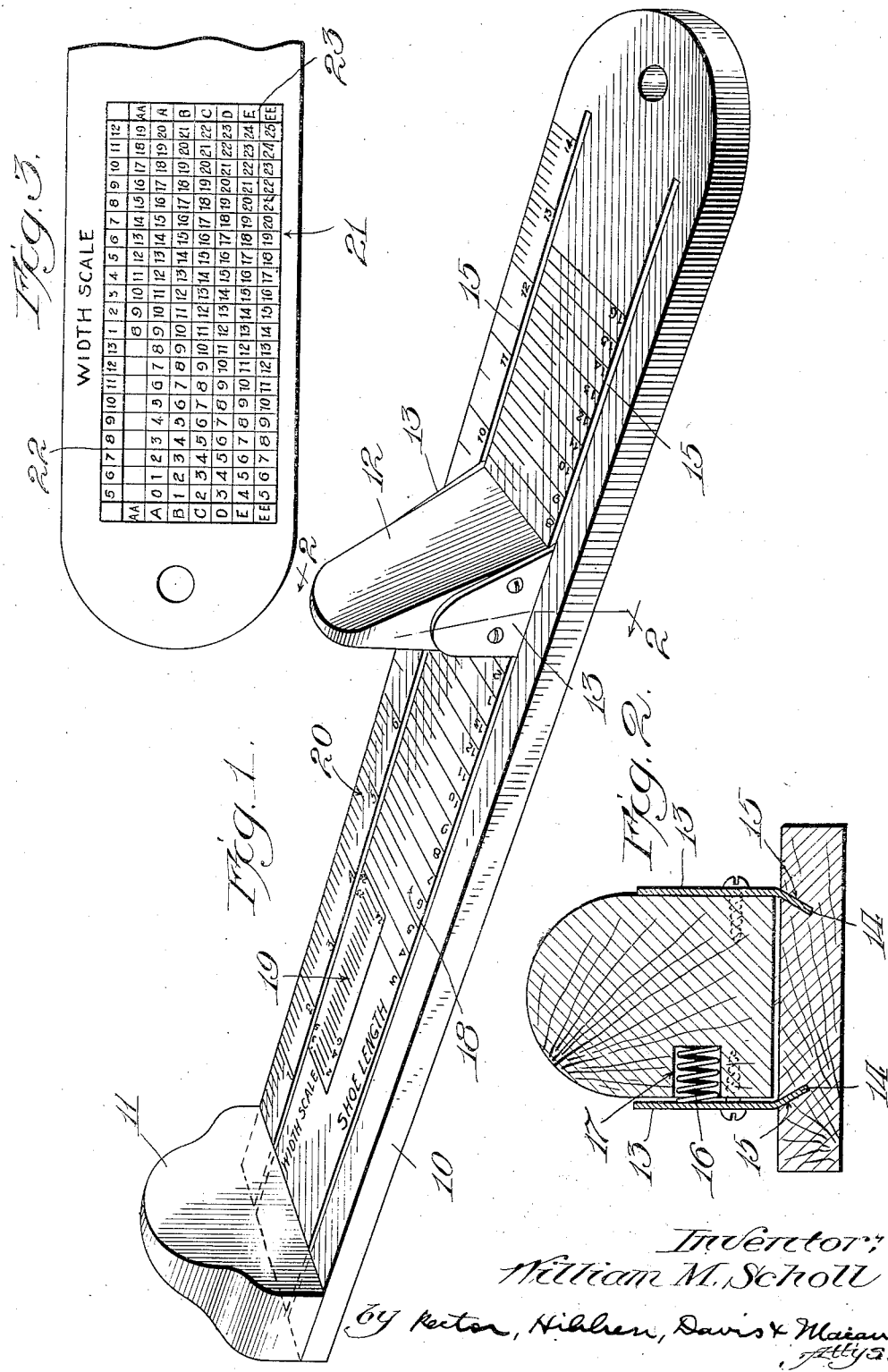

Patented May 7, 1935

2,000,257

UNITED STATES PATENT OFFICE 2,000,257

FOOT MEASURE AND SHOE SIZE INDICATOR

William M. Scholl, Chicago, Ill.

Application February 15, 1934, Serial No. 711,323

3 Claims. (Cl. 33—3)

My invention relates to a foot measuring and shoe sizing indicator and is concerned more particularly with an improvement on the type of indicator or stick disclosed in the United States Letters Patent to Ritz-Woller, No. 1,199,423, dated September 26, 1916.

The indicator shown in the patent comprises a rather narrow stick having a fixed block at one end and a movable block which slides over the surface of the stick and on which is arranged a length scale and a width scale which, in conjunction with a suitable chart, can be utilized to determine the approximate size of shoe required for any particular foot. In the use of this stick, the foot was merely rested against the scale surface of the stick with the heel of the foot contacting the fixed block to determine the length of the foot and with the side of the foot contacting the fixed block to determine the width of the foot. Measurements obtained by the foregoing stick were not entirely satisfactory, because adequate provision was not made for the spreading of the foot when subjected to the weight of the person.

It is therefore the principal object of my invention to devise an indicator in which the length and width scales are marked on a base member having a width sufficient to comfortably support through the foot the complete weight of a standing person, thereby insuring a more accurate determination of the length and width of the foot since the latter expands or spreads when subjected to weight.

These and further objects of my invention will be set forth in the following specification, reference being had to the accompanying drawing, and the novel means by which said objects are effectuated will be definitely pointed out in the claims.

In the drawing:

Figure 1 is a perspective view of my improved indicator showing the length and width scales on the upper surface thereof;

Fig. 2 is a section along the line 2—2 in Fig. 1, looking in the direction of the arrows and showing the manner of guiding the movable block along the base member of the indicator; and Fig. 3 is a partial bottom plan view of the indicator showing the chart for translating into shoe widths, expressed in letters, the information obtained from the length and width scales of the indicator.

Referring to the drawing, the numeral 10 designates the base member of the indicator which is formed with a generally rectangular shape and whose width is such that it will comfortably support the foot of a person when subjected to the latter's weight, or, in other words, the width of the base member approximates that of the foot. A fixed block 11 is attached to one end of the base 10 and a block 12 is slidable over the upper surface thereof. In order to adequately guide the block 12 along the base member, plates 13 are attached to the opposite sides of the block and each is provided with a portion 14 that is preferably bent out of the plane of the plate for insertion in an inclined slot 15 provided in the base member. By so bending the portions 14, they not only exercise a guiding action on the block 12, but also prevent relative separation of the block from the base member. The block 12 is frictionally maintained in any position to which it may be moved by the simple expedient of providing a loose mounting for one of the plates 13, the left hand one as viewed in Fig. 2, and contacting the inner surface of the plate by a coil spring 16 which is mounted in a pocket 17 in the block. The outward extension of this spring tends to rock the plate 13 and so binds the associated part 14 within the slot 15.

The grooves 15 extend substantially the length of the base member 10 and on the upper surface of this member between the grooves are provided length and width scales 18 and 19. The length scale is regularly and equally marked by graduations beginning with length 3 (infant's size) and extending up to and including length 16, while the width scale includes markings from 0 to 25, the distance of the 0 line on the width scale from the fixed block indicating the narrowest width of shoe last in infant's footwear. The upper surface of the base member may also be provided with an ordinary inch scale 20 which may be useful under certain conditions.

On the back or under surface of the base member, there is provided a computing chart 21. This chart is marked off in a number of quadrangles arranged in horizontal and vertical rows, the numerals in the upper horizontal row 22 designating the length sizes as determined from the length scale, while the remaining numerals arranged in vertical rows indicate the different readings as obtained from the width scale. The vertical rows 23 at each end of the chart are provided with letter designations corresponding to the usual letters which indicate shoe widths.

In use, the indicator is placed on the floor or some other firm supporting structure and the customer's foot is placed on the measure in a standing position, so that the foot has an opportunity to expand under the body weight. The heel contacts the fixed block 11 and the movable block 12 is shifted along the base member until it contacts with the longest toe the great toe being held down on the base member during this operation in order to insure that the greatest length measurement will be obtained. The position of the block 12 will then determine the proper shoe length, as indicated by the length scale.

The foot is then placed crosswise of the base member with the great toe joint contacting the block 11 and with the entire weight of the person resting on the foot. Block 12 is then moved to contact with the small toe joint, gentle pressure being employed if the foot is thin or flexible, but if the foot is thick and somewhat developed, it is desirable to press more firmly. The reading on the width scale is then determined by the position of the block 12.

The proper size shoe may then be easily and quickly determined by referring to the chart 23. For example, if the length of the foot was found to be 8 on the length scale and the reading on the width scale was the numeral 18, the desired width of shoe, expressed by letters, can be simply found from the chart by first selecting that vertical column in the chart which is headed by the ascertained length numeral, namely 8, and then moving downwardly along this column until the numeral 18 is found. Then by reading horizontally across the chart to either letter column, the accurate shoe width is immediately determined, in this case, the width last "C."

The chart per se and the use of the length and width scales in conjunction therewith, do not form any part of the present invention, as the ascertainment of shoe sizes thereby is identical with that disclosed in the aforesaid patent. It is possible, however, by my improved indicator to make a more accurate determination of shoe sizes, since the latter is not only determined by reference to the characteristics of the foot, as regards width and length, but also by the somewhat changed sizing which is given to the foot when subjected to weight, that is, the indicator insures that the sizing data bears a closer relation to the shape and size of the foot in action.

I claim:

1. A foot measuring stick comprising a base member provided with indicia for determining foot sizes and including a pair of spaced grooves extending into and lengthwise of the upper surface thereof, the grooves being angularly disposed to the thickness of the member, a block fixed at one end of the member, a second block slidable along the member for cooperation with the fixed block to determine foot sizes, and guide members on the slidable block extending into the grooves.

2. A foot measuring stick comprising a base member provided with indicia for determining foot sizes and including a pair of spaced grooves extending into and lengthwise of the upper surface thereof, the grooves being angularly disposed to the thickness of the member and extending toward each other, a block fixed at one end of the member, a second block slidable along the member for cooperation with the fixed block to determine foot sizes, and guide members on the slidable block extending into the grooves.

3. A foot measuring stick comprising a base member provided with indicia for determining foot sizes and including a pair of spaced grooves extending into and lengthwise of the upper surface thereof, the grooves being angularly disposed to the thickness of the member, a block fixed at one end of the member, a second block slidable on the member for cooperation with the fixed block to determine foot sizes, and guide members on the slidable block extending into the groove, one of the members extending along the side of the block and being rockably mounted thereon, and a spring for normally holding the last named member away from the side of the block to thereby bind the guiding portion thereof in the groove and hold the block in the position to which it has been moved.

WILLIAM M. SCHOLL.